Patented Apr. 2, 1929.

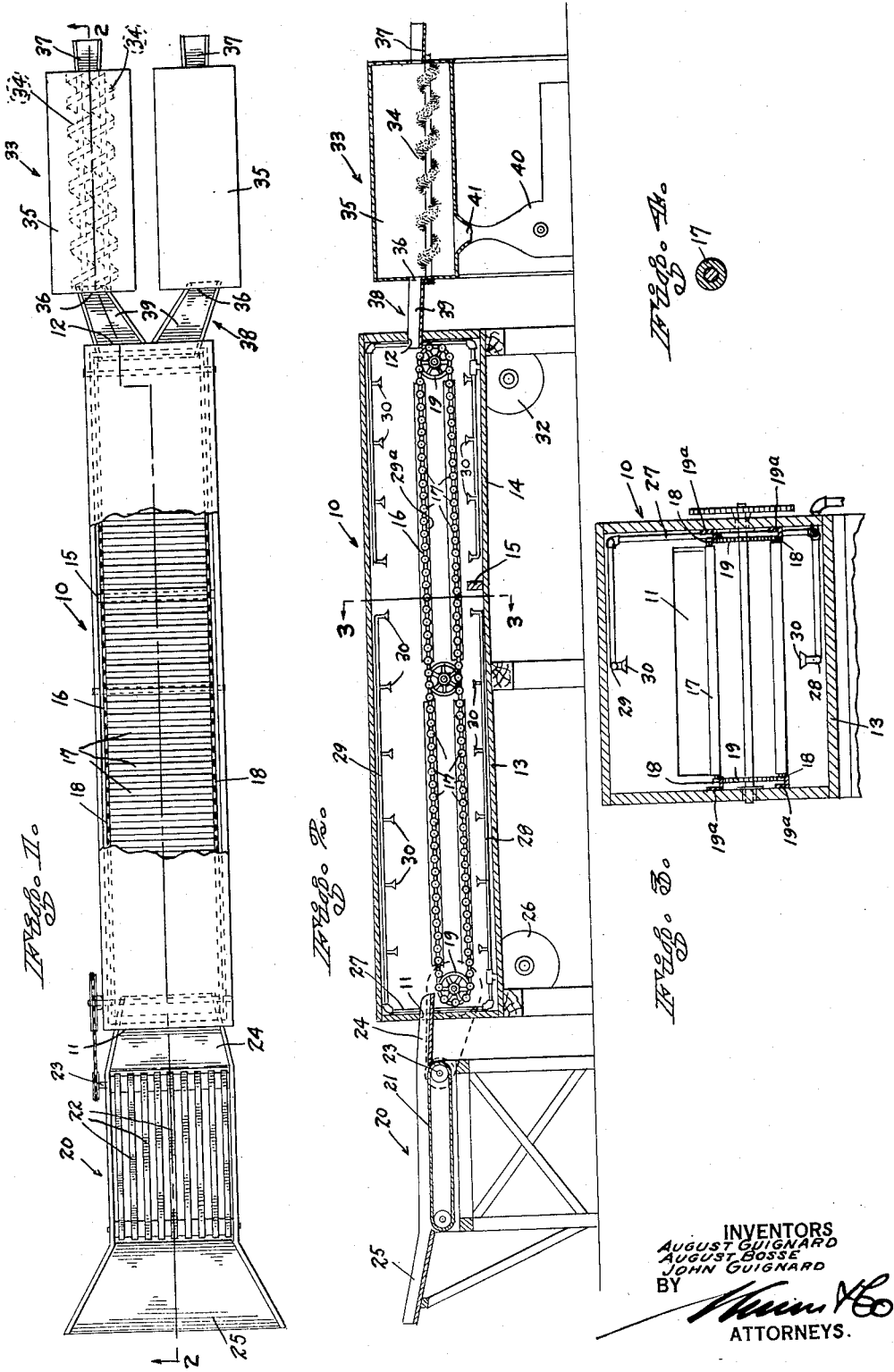

1,707,610

UNITED STATES PATENT OFFICE.

AUGUST GUIGNARD, AUGUST BOSSE, AND JOHN GUIGNARD, OF HOOD RIVER, OREGON.

APPARATUS FOR TREATMENT OF DECIDUOUS FRUIT.

Application filed March 2, 1927. Serial No. 172,095.

This invention relates to apparatus for the treatment of deciduous fruit and has for its primary object the provision of new, novel, useful and positively functioning means for thoroughly removing all traces of arsenate of lead from the fruit, or for neutralizing the effect thereof so that when subsequently washed and dried, the fruit will be entirely clean and in a condition where it may be packed and made ready for the market.

In carrying our invention into practice wherein, as stated, an essential step consists in treating the fruit to eliminate all traces of arsenate of lead, we have devised certain other co-operating novel features for (2) subjecting the fruit to a cleansing or purifying bath, and (3) subjecting the fruit to a drying treatment where all free moisture will be evacuated from the fruit so that same is in a perfectly dry state when packed for shipment.

The invention, among other novel features of construction embodies a bath tank having means for conveying fruit therethrough while subjecting same to the action of one or more bath solutions or liquids; and mechanisms operating in time with the process of so conveying the fruit for permitting the conveying operation to be continuously conducted, thereby making it possible for the equipment to handle a maximum quantity of fruit in a minimum period of time.

We lay great stress upon the construction and operation of means for neutralizing the spray residue which is contained upon the surface of the fruit as the latter comes from the orchard, and we find that this important purpose in view can be carried into practical operation by expelling this spray residue or by neutralizing the effect thereof by virtue of a suitable chemical or acid solution such as a solution of hydrochloric acid to the action of which the fruit is subjected for an interval, preferably about twenty seconds, while the fruit is in flight or in continuous movement. We provide a course of travel for the fruit and divide same into what we term (1) a neutralizing zone, and (2) a washing zone, calculating the distance of travel of the fruit through the neutralizing zone so that, without a doubt, the arsenate of lead residue or poisonous spray compound, or insecticide, as the case may be, will be expelled from the fruit previous to or following (2) the process of washing the fruit with clear water within the area of said washing zone, and (3) the process of further conveying the fruit while subjecting same to the action of a drying treatment.

In order that the work can be carried on with dispatch coupled with a high measure of thoroughness, we provide a bath tank through which the fruit is adapted to be conveyed while being subjected to the action of the heretofore mentioned bath liquids and in order that the fruit can be fed rapidly to said tank, we associate same with a sorting table at the respective sides of which the operators may stand and separate the undesirable fruit from the desirable or choice fruit, as the latter proceeds to the tank.

We have further directed our attention to a form of sorting table which may be used as above set forth and which will be further characterized by means to cause leaves, fruit spurs, and other refuse to be separated from the fruit automatically as the fruit is being fed to the bath tank, thereby preventing such matter from entering the tank where it would be liable to clog the circulating ducts thereof.

It is a further and important object of our invention that means are employed for causing the water remaining on the fruit as the latter emerges from the aforementioned tank to be removed by centrifugal force induced by the action of revolving brushes, and for supplementing this action of the brushes by introducing a current of warm or hot air in the path of travel of the fruit over said brushes where it is employed, both as a drying medium for evaporating the free moisture contained upon the fruit and for drying said brushes.

It is a further object of our invention to provide means whereby a fixed quantity of neutralizing acid may be held in constant circulation so that the work can be conducted without waste.

Another object of the invention is to provide a novel form of conveyor capable of handling a large quantity of fruit at one operation, and which is equipped with means at the outlet of the tank for dividing the discharging flow of the fruit and for causing substantially uniform or equal portions of the mass to be delivered to respectively separate or side by side drying mechanisms, thus enabling the machine to operate upon an exceedingly large quantity of fruit in a very short space of time, while producing a machine of comparatively small size that will take up but little floor space.

It is a further object of our invention to provide a spray system functioning as aforementioned and further operating as a means for turning the fruit as it is conveyed through the spray, the spray coming in impinging contact with the fruit as it travels over its course, thereby setting up this turning motion and causing all portions of the fruit to be thoroughly subjected to the action of the spray.

With the above and other objects in view which will appear as the nature of the invention is better understood, the same consists in the improved construction and novel arrangements of parts which will hereinafter be fully described and particularly pointed out in the claims.

In the accompanying drawings has been illustrated the preferred form of the invention, it being, however, understood that no limitations are necessarily made to the precise structural details therein exhibited, but that changes, alterations and modifications within the scope of the claims may be resorted to when desired.

Figure 1 is a view in plan of the machine;
Figure 2 is a section taken on line 2—2 of Figure 1;
Figure 3 is a fragmentary transverse section taken approximately on the line 3—3 of Figure 2, and Figure 4 is a cross section through a conveyor rod used in our device.

We make use of a bath tank 10 having a fruit intake 11 at one end and an outlet 12 at its opposite end. The tank is formed with a bottom having portions 13 and 14 which are respectively oppositely inclined downward and which are separated from each other by a transverse rib or curb 15.

Within the tank is an endless conveyer 16, the same made up of round rods 17 covered with soft rubber as a means of protection to the fruit when in contact therewith. These rods are suitably spaced apart to allow intercepted liquid sprays or showers to pass through the spaces therebetween. Said rods are carried by chains 18 which run over the sprockets 19 and which find support against sagging by resting in free moving contact with rails 19ª mounted on the respective sides of the tank. The conveyer can of course be driven in any suitable well known manner and at such speed as may be found desirable for the purpose intended.

Adjacent to the intake 11 of the tank 10 is a sorting table 20 having a foraminated conveyer 21 consisting in the present instance of a series of spaced apart rubber belts 22 all of which are adapted to be driven at the same speed by suitable power applied to the shaft 23. In this manner of constructing the conveyer 21, it manifestly follows that as fruit is deposited upon same and as the fruit moves toward the intake 11, undesirable matter such as leaves and other trash will fall through the spaces between the belts and onto the ground below. This refuse matter is arrested and held against entering the tank 10 where it might clog the liquid circulating ducts thereof. The table is further of a design so that as fruit is poured upon it, cull fruit can be taken out by the hands of assistants at the respective sides of said table, thus reducing the amount of useless fruit going into the machine, and increasing the capacity to a marked extent. The table has its discharge end provided with a chute 24 which passes into the opening 11 where it overlies the front end of the conveyer 16. The opposite end of the table has a hopper or tray 25 for receiving the fruit as it is manually poured therein and which functions to permit the fruit to discharge upon the belts 22 of said table.

Within the tank 10 is a spray system which extends within a neutralizing zone, the same consisting of that space within the tank occupying a position at the left of the curb 15. Said system consists of a pump 26 from which a pipe line 27 extends and is operatively associated, and, as illustrated, said pipe line has a lower branch 28 underlying the conveyer 16 and a branch 29 which overlies said conveyer. Each of these branches carries spray nozzles 30, those on the branch 28 extended upward and those of the branch 29 extending downward so that showers or sprays are respectively discharged in two directions, each intercepted by the plane of movement of the conveyer and adapted to be ejected entirely through the interstices of the conveyer surfaces where the fruit on the upper lead of the conveyer will come in effective contact therewith.

A spray system 31 is made to occupy the space within the tank 10 at the right hand side of the curb 15 which we have elected to refer to as a washing zone. This system is identical in construction with the spray system contained within the aforementioned neutralizing zone and is connected with a force or pressure pump 32 so that continuous showers or sprays of clear water may be made to traverse the path of movement of the conveyer from points both above and below same.

The drying mechanism 33 consists in the present instance of two side by side sets of spiral drying and cleaning rolls or brushes 34—34. These rolls or brushes are set parallel to each other and near enough together to permit fruit to come between them and to be impelled thereover for the length of said brushes. The brushes of each of said sets can be driven respectively in opposite directions or they may be driven in the same directions, as may be found most expedient. Said brushes of each of the sets above mentioned are mounted within a container 35 having centrally disposed inlets 36 and correspondingly disposed outlets 37. The discharge end of the tank 10 is provided with a deflector 38 having inclined runways 39—39, one for each of the brush sets above referred to, the outer ends of said runways entering the containers 35 at points directly above the intake ends of the companion brushes 34.

A blower 40 conventionally illustrated herein is employed for the purpose of delivering by forced draft a continuous blast of hot air. This blower is provided with a discharge duct 41 for each of the containers 35. Said duct leads upward from the blower and is connected with the bottom of its container near the intake end thereof. In this manner a stream of hot air may be constantly made to impinge against the brushes 34, maintaining them in a dry condition and the said hot air is permitted to flow through the brush container and around the brushes therein so as to accelerate the drying action both of the fruit and the bristles of the brushes. In addition to this action of the air upon the fruit and the wiping action of the bristles against the fruit, we rely upon the centrifugal action of the brushes to dissipate the free moisture contained upon the fruit.

The discharge end of the tank 10 is slightly at a higher level than the intake end thereof, and the companion brushes 34—34 of each container 35 are slightly inclined downward toward the discharge 37, thereby increasing the speed of the fruit traveling along said brushes.

In operation, fruit to be prepared is deposited upon the sorting table, it being understood that the belts 22 are in motion so as to set up travel of the fruit in the direction of the intake 11 of the bath tank 10. The fruit then falls upon the top lead of the conveyor 16 where it is subjected to the action of an acid spray delivered crosswise of the plane of travel of the conveyor. The jets or sprays of acid solution traverse the conveyor both from above and below same. The conveyor being of a foraminated structure permits the sprays or jets of acid solution to freely pass through so as to find effective contact with the fruit. There is sufficient impact force of the jets or sprays against the fruit to set up slight agitation or turning movement therein, in order that all surfaces of the fruit can be thoroughly treated in the period of travel of the fruit through the neutralizing zone, which occupies the space to the left of the curb 15. It shall, of course, be understood that the conveyor shall be given such speed of movement as may be found necessary to such treatment of the fruit that will neutralize the action of all traces of arsenic of lead residue contained upon the fruit as it is taken from the orchard. The length of the neutralizing zone is so calculated and the speed of movement of the conveyor likewise previously calculated that the fruit under treatment of the acid spray may be subjected thereto for a period of about twenty seconds. The acid solution which we employ as a spray may be of any suitable well known character such as 1% solution of hydrochloric acid.

The fruit then emerges from the neutralizing zone and proceeds through the washing zone where it is subjected to the action of clear water made to traverse the plane of travel of the conveyer. The clear water is discharged in jets or sprays from points respectively above and below the conveyer where it passes through the interstices of the conveyer for a return to the pump system employed for forced circulation. The length of the clear water spray zone is calculated so that the length of travel of the fruit within the zone will be sufficient to expel from the fruit all traces of the acid solution employed in the first said zone. The fruit then finds egress from the bath tank 10 and the mass of discharging fruit is divided respectively into portions of the same quantities. These portions are then deflected to the respective containers 35—35 where the fruit is deposited upon the parallel and downwardly inclined spiral brushes 34. These brushes are of a length sufficient to effect a perfect drying of the fruit before the fruit is discharged from the outlets 37. The brushes, as stated, may be revolved in the same direction or may be revolved respectively in opposite directions, but in either event the speed of rotation tumbles the fruit so that all surfaces thereof are subjected to the action of the brush bristles, to be wiped thereby. It is of course understood that these brushes are placed close enough together to support the fruit and convey it along on top or between the brushes, so that when the discharge point 37 is reached the fruit can be deposited into receiving receptacles or conveyed to a sizing or grading machine of any suitable well-known type. Also, by placing the brushes close together we are able to utilize the action of centrifugal force or movement of the bristles to effect free carriage of the fruit along its course, and we find that this action of centrifugal force further functions to dissipate certain of the free moisture from the fruit. To additional supplement the drying action and to maintain the brushes in a drying state, a constant blast of warm or hot air is introduced to the containers 35 from points beneath said brushes. We prefer that the intakes from the blower 40 be positioned near the intakes 36. The blast of hot air is delivered upward from points under the brushes and is free to circulate through the containers 35 after its initial impingement against said brushes, all of which is highly desirable for utilizing the advantage of this hot blast both as a dry medium for the brushes and for the fruit. When the fruit is treated in the manner aforementioned, it discharges from the outlets 37 in a perfectly dry and clean state, ready for immediate packing.

While we have shown only the preferred form of the invention, it should be understood that various changes or modifications may be made within the scope of the claims hereto attached without departing from the spirit of the invention.

We claim:

1. In a machine of the character described, a tank having a conveyor for fruit movable therein from end to end, means for directing sprays of different liquids at consecutive sections of the conveyor for treating the fruit and means for draining the liquids toward opposite ends of the tank for keeping the same separate.

2. In a machine of the character described, a tank having a conveyor for fruit movable therein from end to end and means for directing sprays of different liquids at consecutive sections of the conveyor for treating the fruit, the bottom of the tank being made to slope from an intermediate transverse line in opposite directions for maintaining the liquids separate.

AUGUST GUIGNARD.
AUGUST BOSSE.
JOHN GUIGNARD.